Figure 6:
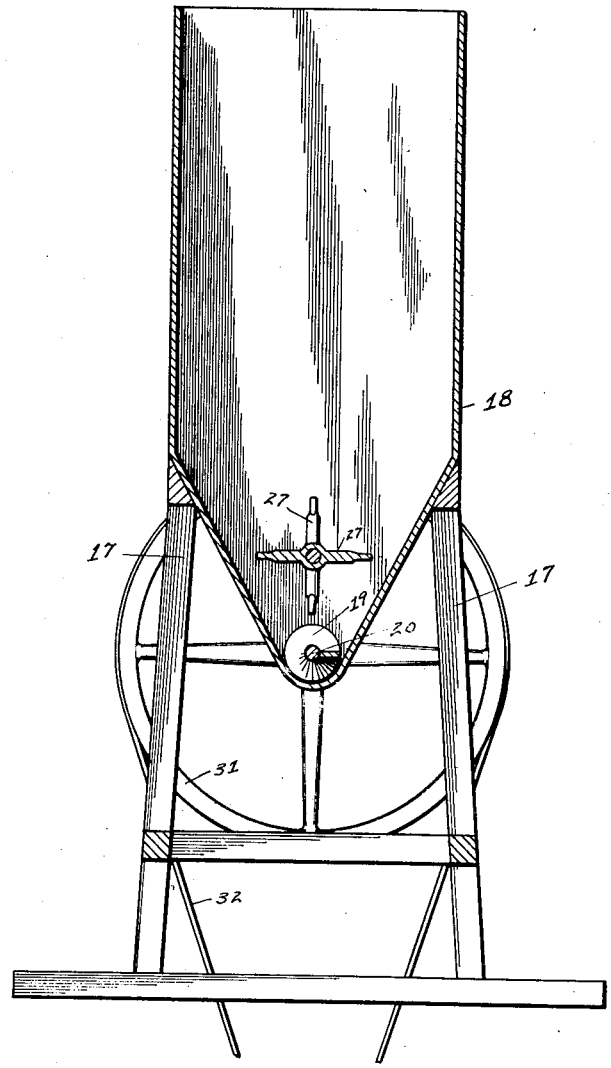

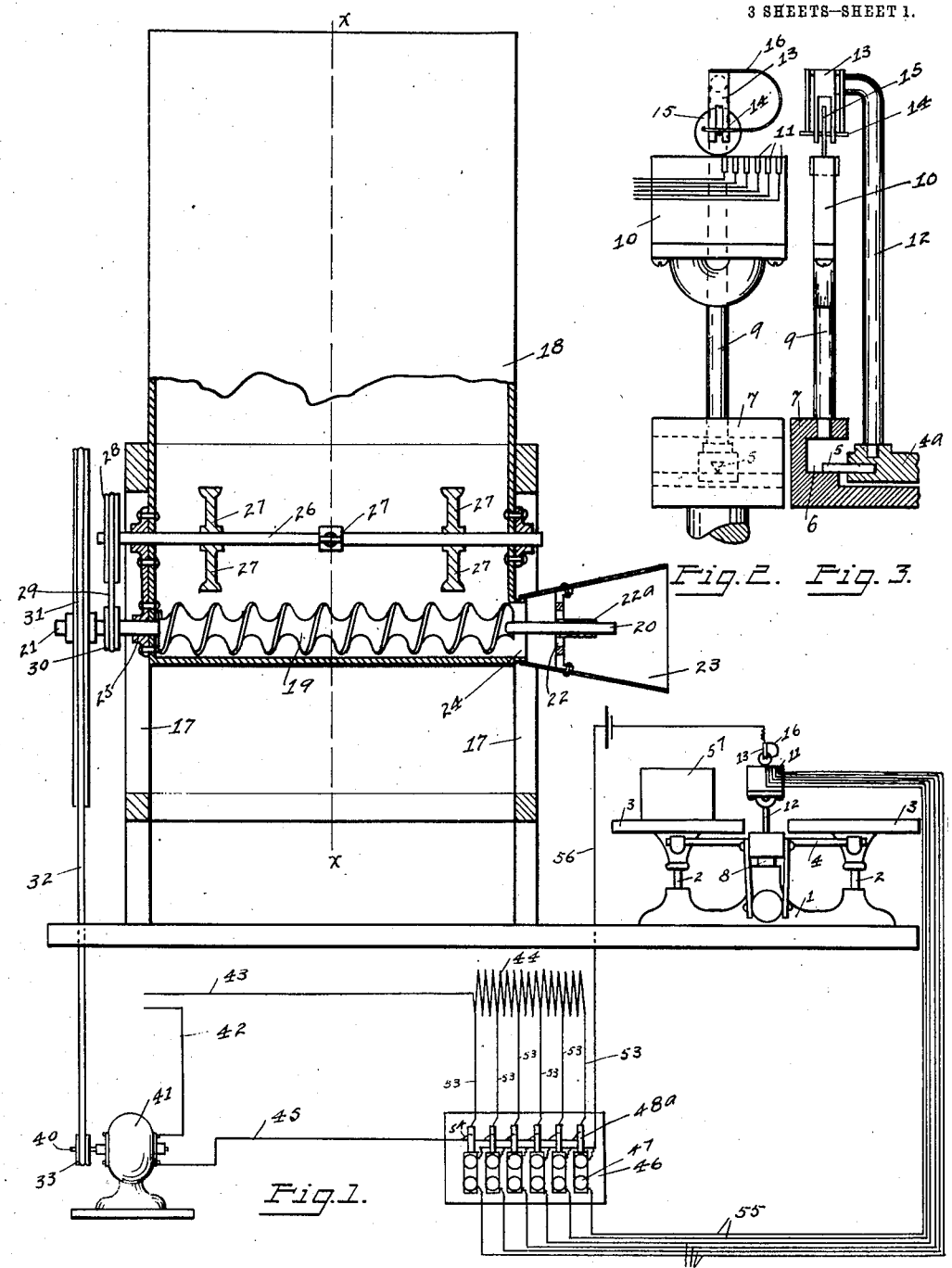

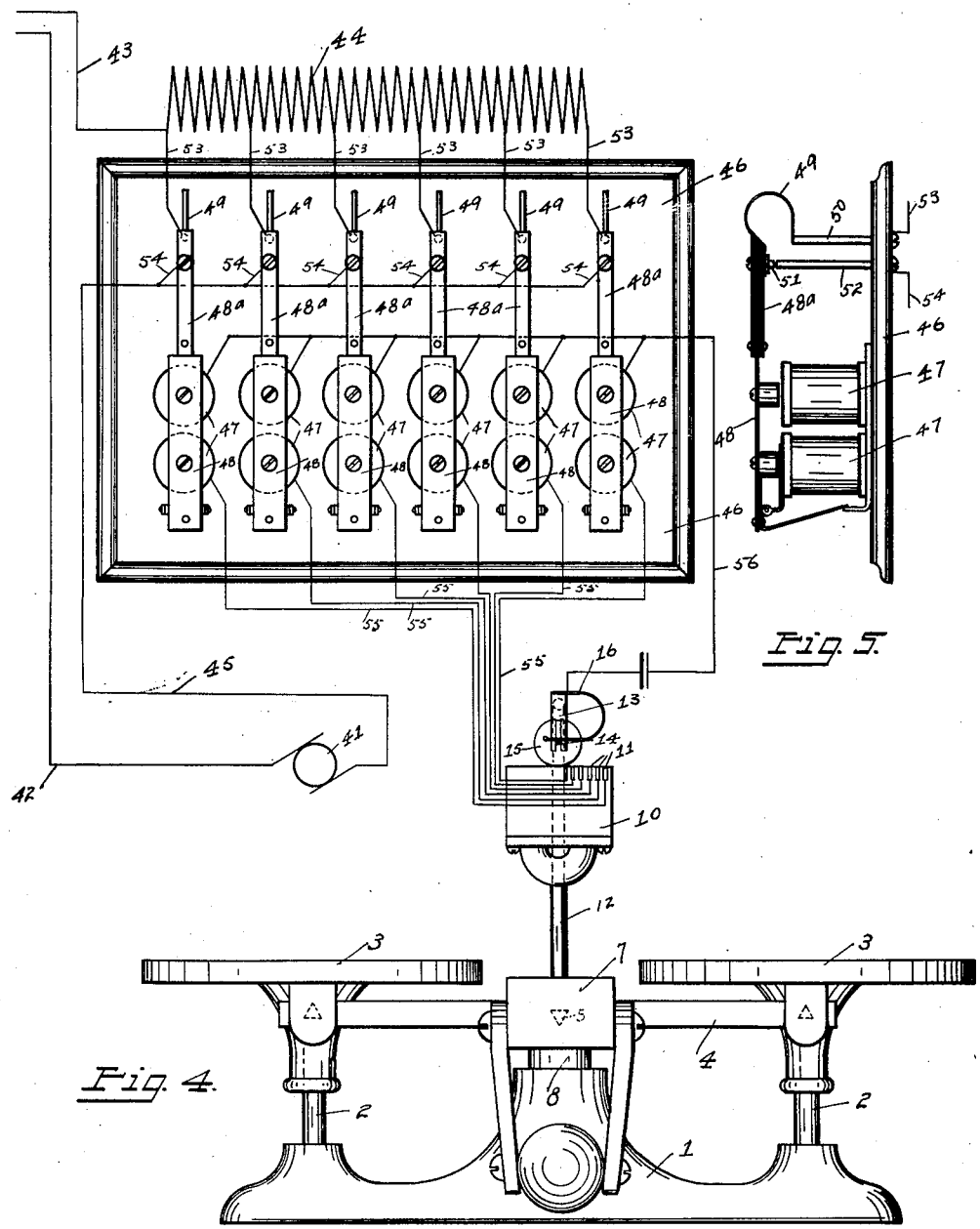

W. S. SMITH.
ELECTRICALLY CONTROLLED WEIGHING DEVICE.
APPLICATION FILED JUNE 27, 1910.

1,001,562.

Patented Aug. 22, 1911.
3 SHEETS—SHEET 3.

Witnesses
E. B. Maurer
A. L. Phelps

Inventor
Walter S. Smith

By
C. C. Shepherd
Attorney

UNITED STATES PATENT OFFICE.

WALTER S. SMITH, OF COLUMBUS, OHIO, ASSIGNOR TO THE COLUMBUS ELECTRIC SCALE COMPANY, OF COLUMBUS, OHIO, A CORPORATION OF OHIO.

ELECTRICALLY-CONTROLLED WEIGHING DEVICE.

1,001,562.  Specification of Letters Patent.  Patented Aug. 22, 1911.

Application filed June 27, 1910. Serial No. 569,144.

*To all whom it may concern:*

Be it known that I, WALTER S. SMITH, a citizen of the United States, residing at Columbus, in the county of Franklin and State of Ohio, have invented certain new and useful Improvements in Electrically-Controlled Weighing Devices, of which the following is a specification.

My invention relates to the improvement of electrically controlled weighing devices and the objects of my invention are to provide a machine of this character of improved construction and operation embodying improved means for automatically controlling the discharge on to scales of a predetermined quantity of material; to so construct my improved weighing and controlling mechanism as to insure accuracy in the weighing of predetermined amounts of material and to produce other improvements in the construction and operation of my machine which will be more fully pointed out hereinafter. These objects I accomplish in the manner illustrated in the accompanying drawings, in which—

Figure 1 is a view partly in section and partly in elevation of my improved weighing apparatus, Fig. 2 is an enlarged detail view of the scales tower and head, Fig. 3 is a view of the scales tower at right angles with that shown in Fig. 3, the tower supporting frame being shown in section, Fig. 4 is an enlarged detail view in elevation of the scales and electric controlling mechanism, Fig. 5 is an end elevation of the electric controller, and, Fig. 6 is a central vertical section on line $x$—$x$ of Fig. 1.

Similar numerals refer to similar parts throughout the several views.

In carrying out my invention, I employ a suitable make of balanced weighing scales, which comprises the usual base 1 in which are mounted on opposite sides of the center, vertically movable standards 2 each carrying at its upper end the weighing table or head 3. This head is connected by the usual scale beam 4, the central cross arm $4^a$ of which is provided at each end with a knife edge bearing 5 which bears in the recess 6 of a fixed transverse frame member 7 which is mounted upon a standard 8 which rises from the center of the scale base 1. Rising from one end of the transverse frame member 7 is a standard or tower 9, the latter having an enlarged head 10 which is provided with a horizontal upper surface and which is formed of insulating material. Carried in the upper portion of this head 10 and flush with the upper surface thereof, are a plurality of separated metallic contact bodies 11.

Rising from one end of the scale beam arm, $4^a$, is a standard 12, the horizontally bent upper end portion of which carries a depending wheel block 13. In the lower portion of this wheel block is journaled on a transverse shaft 14 a metallic contact wheel 15, the periphery of said wheel being retained in bearing contact with the upper side of the head 10 through the medium of spring strips 16, the upper ends of which are connected with the top of the block 13 and the lower end portions of which bear upon the upper side of the shaft 14.

Suitably supported in position adjacent to the scales are the standards or supporting legs 17 of an upright hopper 18, the latter having as indicated in Fig. 6 of the drawing, its lower portion tapered throughout its width, said tapered portion having a rounded lower termination. Within the rounded terminal portion of the hopper is provided a screw conveyer 19, said screw having end spindles or shafts 20 and 21, the spindle 20 bearing in a tubular extension $22^a$ of a bearing bracket 22 which is secured in a flaring discharge spout 23 which extends outward from an opening 24 in the side of the hopper base. The spindle 21 extends outward through the hopper casing and is rotatably mounted in a bearing member 25 which is affixed to the side of the hopper. Above the screw conveyer 19 is journaled parallel with said conveyer an agitator shaft 26 upon which at desirable intervals are carried agitating bars or fingers 27. Above the spindle 21 the shaft 26 is extended outwardly through the hopper and carries thereon a belt wheel 28 which through the medium of a belt 29 is connected with a smaller belt wheel or pulley 30 carried on the spindle 21. On the outer side of the pulley 30 the spindle 21 carries a comparatively large belt wheel 31 and this latter wheel is connected by a belt 32 with a smaller belt wheel 33 carried on the operating shaft 40 of an electric motor 41.

42 and 43 respectively represent electric current conducting wires which lead from a suitable source of electric generation. The wire 42 leads to the motor 41 and the wire 43 to one end of a suitably supported and located resistance coil 44. From the motor a wire 45 leads across a switch or controller board 46 on which board are mounted a plurality of magnets 47 the number of these magnets being equal to the number of contact bodies 11 carried by the head 10. The armature bar 48 of each magnet is provided with an extension 48ª formed of insulating material, which extension is connected through the medium of a curved spring 49 with the upper end of a contact post 50 which rises from the board 46. The spring 49 also connects with a contact projection 51 on the underside of the armature bar extension 48ª, said spring normally holding said contact projection 51 out of contact with the upper end of a contact post 52 which also rises from the board 46. From separated points on the resistance coil, wires 53 lead to the contact posts 50 and wires 54 connect the wire 45 at intervals with the posts 52. The magnets 47 are connected respectively with the contact members 11 and with the contact wheel spring 16 through a separate battery circuit. Of these connections, wires 55 lead from one set of coils of the magnets 47 to the contact bodies 11 and 56 represents the connecting wire between the remaining magnet coils and the spring 16.

In utilizing my device, it will be understood that the material to be weighed, is contained in the hopper or reservoir 18 and that through the belt wheel connections between the motor, the screw conveyer 19 and the agitator shaft 26, rotary motion is designed to be imparted to said conveyer and shaft, with the result that the material which is agitated by the fingers 27 is fed outward by the screw conveyer through the discharge member 23, from which the material drops into a can, box, or other suitable receptacle such as is indicated at 57 and which rests upon one of the scale pans or heads 3. It is obvious that the remaining scale pan or head is designed to support a suitable weight body.

Prior to the beginning of the operation of discharging material from the hopper, the contact wheel 15 is adjacent to but out of contact with the inner contact body 11. When the weight is deposited upon the weight pan, however, it is obvious that the swinging movement of the scale beam, will result in moving the contact wheel 15 upon the head 10 to a point where it is adjacent to but out of contact with the first or outer contact body 11. The motor shaft being set in motion through the operation of a suitable controlling switch, it is obvious that in the manner described, material will be fed from the lower portion of the hopper and deposited in the receptacle 57 which is located upon the higher pan of the scales. When sufficient weight has thus been imparted to the receptacle and the upward movement of the weight carrying pan beams, it is obvious that the tipping of the scale beam, will result in the contact wheel 15 traveling successively over the contact bodies 11 until said wheel is again out of contact with the inner contact body or in the position shown in the drawings.

Owing to the connections heretofore described, it will be understood that the traveling movement of the wheel from one contact body to another, will result in gradually closing a circuit through a greater portion of the resistance coil, the resistance to the current being thus gradually increased and the speed of the motor decreased until the contact wheel has passed the lowest or inner contact body. By this operation it will readily be understood that the speed of the screw conveyer, will be reduced to a minimum as the scale pans approach the balance position, thus preventing the discharge of more than a predetermined quantity of material from the hopper after the scale pans are balanced.

It is apparent that the mechanism herein described, is particularly adapted for the weighing of material which is intended to be marketed in cans or packages containing exact predetermined quantities.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is—

1. In a weighing mechanism, the combination with a material containing hopper and a discharging device in connection therewith, of weighing scales, stationary electric contacts mounted on the scale frame, and a movable member supported from the scale frame and adapted to travel over said contacts, the construction and operation being such that the flow from the hopper gradually diminishes as the load on the scale increases.

2. In a weighing mechanism, the combination with a material containing hopper and a discharging device in said hopper, of weighing scales, and electric means comprising a series of magnetic contacts controlled by the weight of the material discharged from the hopper and which control the speed of delivery of material discharged from the hopper, said discharge gradually diminishing as the amount of material on the scales approaches a predetermined weight.

In testimony whereof I affix my signature in presence of two witnesses.

WALTER S. SMITH.

Witnesses:
C. C. SHEPHERD,
INGLE A. MORRIS.